United States Patent
Hellman (10) Patent No.: US 10,948,715 B2
(45) Date of Patent: Mar. 16, 2021

(54) CHROMATIC LENS AND METHODS AND SYSTEMS USING SAME

(71) Applicant: Brandon Hellman, Phoenix, AZ (US)

(72) Inventor: Brandon Hellman, Phoenix, AZ (US)

(73) Assignee: Hellman Optics, LLC, Tucson, AZ (US)

( * ) Notice: Subject to any disclaimer, the term of this patent is extended or adjusted under 35 U.S.C. 154(b) by 0 days.

(21) Appl. No.: 16/557,538

(22) Filed: Aug. 30, 2019

(65) Prior Publication Data

US 2020/0073117 A1    Mar. 5, 2020

Related U.S. Application Data

(60) Provisional application No. 62/725,736, filed on Aug. 31, 2018.

(51) Int. Cl.
*B01J 3/02* (2006.01)
*G01J 3/28* (2006.01)
(Continued)

(52) U.S. Cl.
CPC ........ *G02B 27/0025* (2013.01); *G01J 3/0208* (2013.01); *G01J 3/2803* (2013.01);
(Continued)

(58) Field of Classification Search
None
See application file for complete search history.

(56) References Cited

U.S. PATENT DOCUMENTS

| 1,629,361 A | 5/1927 | Polack |
| 2,850,945 A | 9/1958 | Kohler |

(Continued)

FOREIGN PATENT DOCUMENTS

| WO | 2006054195 | 5/2006 |
| WO | 2011138606 | 11/2011 |

OTHER PUBLICATIONS

Petran, M., et al., "The Tandem Scanning Reflected Light Microscope," Scanning, vol. 7, pp. 97-108, 1985.
(Continued)

*Primary Examiner* — Shawn Decenzo
(74) *Attorney, Agent, or Firm* — Bond, Schoeneck & King, PLLC (57) ABSTRACT

A camera system for providing multispectral imaging of an object, the camera system having a longitudinal axis. The camera system comprises a quasi-collimating lens capable of receiving light from the object and separating wavelengths of the light. Each wavelength is projected to one of a plurality of intermediate image locations which are separated along the longitudinal axis. The system also comprises an achromatic imaging lens to receive the projected wavelengths of light from the quasi-collimating lens, and a pixelated detector positioned to receive the light from the achromatic imaging lens. The achromatic imaging lens and the pixelated detector are movable relative to one another in the direction of the longitudinal axis. The system is configured such that the projected wavelengths of light each form a corresponding image, the images formed on the detector when different distances within the range are achieved.

19 Claims, 4 Drawing Sheets

(51) Int. Cl.

| | | |
|---|---|---|
| *G01J 3/32* | (2006.01) | |
| *G02B 27/00* | (2006.01) | |
| *G02B 9/10* | (2006.01) | |
| *H04N 5/225* | (2006.01) | |
| *H04N 9/04* | (2006.01) | |
| *G02B 27/30* | (2006.01) | |
| *G01J 3/02* | (2006.01) | |

(52) U.S. Cl.
CPC .................. *G01J 3/32* (2013.01); *G02B 9/10* (2013.01); *G02B 27/30* (2013.01); *H04N 5/2253* (2013.01); *H04N 5/2254* (2013.01); *H04N 9/0451* (2018.08)

(56) References Cited

U.S. PATENT DOCUMENTS

| | | | |
|---|---|---|---|
| 3,604,786 A | 9/1971 | Baker | |
| 4,171,872 A | 10/1979 | Baker | |
| 4,496,223 A | 1/1985 | Baker | |
| 4,742,222 A | 5/1988 | Retfalvy et al. | |
| 5,161,052 A | 11/1992 | Hill | |
| 5,479,258 A | 12/1995 | Hinnrichs et al. | |
| 5,986,758 A | 11/1999 | Lyons et al. | |
| 6,038,066 A | 3/2000 | Baumann | |
| 6,552,788 B1 | 4/2003 | Castle | |
| 6,741,760 B2 | 5/2004 | Hayashi et al. | |
| 7,900,391 B1* | 3/2011 | Mihelish | F41A 31/02 42/116 |
| 8,279,544 B1 | 10/2012 | O'Neill | |
| 8,878,968 B2 | 11/2014 | Blayvas | |
| 8,934,179 B2 | 1/2015 | Ishizaka | |
| 8,988,590 B2 | 3/2015 | Gillet et al. | |
| 9,055,248 B2 | 6/2015 | Atif et al. | |
| 9,071,737 B2 | 6/2015 | Blayvas et al. | |
| 9,523,609 B2 | 12/2016 | Vallejo Veiga et al. | |
| 9,706,094 B2 | 7/2017 | Frayer | |
| 9,800,804 B2 | 10/2017 | Atif et al. | |
| 9,945,777 B2 | 4/2018 | Gillet | |
| 10,094,656 B2* | 10/2018 | Masuda | G01B 11/14 |
| 2008/0112029 A1* | 5/2008 | Bodkin | G02B 17/0808 359/233 |
| 2010/0004773 A1* | 1/2010 | Kochergin | G01N 21/211 700/103 |
| 2013/0278726 A1 | 10/2013 | Muhammad et al. | |
| 2016/0003675 A1 | 1/2016 | Abolbashari et al. | |
| 2017/0205341 A1 | 7/2017 | Gillet | |
| 2018/0013965 A1 | 1/2018 | Atif et al. | |

OTHER PUBLICATIONS

Cu-Nguyen, Phuong-Ha, et al., "An imaging spectrometer employing tunable hyperchromatic microlenses", Light: Science & Applications, vol. 5, e16058; pp. 1- 9, (2016).

Thorlabs, DCC1645C-Manual.pdf; https://www.manualslib.com/download/810833/Thorlabs-Dcu223x.html; printed Aug. 29, 2019.

Greivenkamp,J.E., "Field Guide to Geometrical Optics", Bellingham, WA, SPIE Press, 2004; https://www.spiedigitallibrary.org/ebooks; pp. 47, 68.

He, Peidong, et al., Spectral acquisition method based on axial chromatic and spherical aberrations of lens, Optics Express, vol. 27, No. 15, Jul. 22, 2019; 14 pages.

Zhan, Shuyue, et al., Hyperspectral Imaging Bioinspired by Chromatic Blur Vision in Color Blind Animals; MDPI, Photonics 2019, 6, 91, Aug. 12, 2019; pp. 1-11.

Faggiano, A., et al., Longitudinal Chromatic Aberration Spectroscope, Proceedings of SPIE, vol. 656 Contemporary Optical Instrument Design, Fabrication, and Testing (1986), Oct. 26, 1986; pp. 213-218.

Lyons, Denise, Image spectrometry with a diffractive optic, Proceedings of SPIE vol. 2480, Imaging Spectrometry, Jun. 12, 1995, pp. 123-131.

Thorne, Travis David, Design of Hyperspectral Imaging Smartphone Lens Attachment and Application, Thesis Paper, The University of Arizona, http://hdl.handle.net/10150/632651, May 2019; 49 pages.

Altememee, Hedar et al., Hyperspectral Imaging Smartphone, University of Arizona Engineering Design Day, public poster session, Apr. 29, 2019.

* cited by examiner

CHROMATIC LENS AND METHODS AND SYSTEMS USING SAME

RELATED APPLICATION

The present application claims the benefit of U.S. Provisional Application No. 62/725,736 filed on Aug. 31, 2018 having a title CHROMATIC LENS AND METHODS AND SYSTEMS USING SAME under 35 U.S.C. § 119(e), the substance of said application is hereby incorporated by reference in its entirety.

FIELD

Chromatic lenses and methods and systems for capturing and/or facilitating the capture of multispectral image information.

BACKGROUND

There is a growing interest in capturing multispectral information of objects. The use of multispectral image information has found many applications, such as determination of food quality and safety, detection of counterfeit currency, and screening for cancer, to name a few.

A significant component of any system providing multispectral image information is a dispersive unit that separates wavelengths or wavelength bands of light from an object for subsequent analysis. Conventional dispersive units for such multispectral imaging systems have employed components such as diffraction gratings, prisms, lenses and/or filters, and some rely on movement of such components.

While some conventional multispectral imaging systems are dedicated instruments for obtaining multispectral image information, others have sought to adapt existing hardware such as camera phones for use in obtaining multispectral image information. Camera phones typically have imaging optics, a detector array, a focus-compensating mechanism including apparatus to translate the imaging optics or detector, highly-developed hardware including a processor and software to process full-color images. Adaptation of a camera phone includes providing a dispersive element or wavelength filter to be used with the camera phone.

Dispersive units or wavelength filters for use with camera phones and other imaging systems have been relatively complex, requiring significant and costly development and/or production, such as tunable MEMS-based Fabry-Perot filters.

SUMMARY

Aspects of the present invention apply the concept that a chromatic lens having a relatively large back image distance can be added to a conventional achromatic camera lens system to provide a camera with multispectral image formation capabilities.

According to some aspects of the invention, the Applicant employs a quasi-collimated, refractive-only, optical system to operate along with a conventional, highly-corrected achromatic, camera lens to project a plurality of spectrally-separated images toward a pixelated image detector.

An aspect of the present invention is directed to a camera system for providing multispectral imaging of an object. The camera system has a longitudinal axis. The camera system comprises a quasi-collimating lens capable of receiving light from the object and separating wavelengths of the light. Each wavelength is projected in a direction corresponding to one of a plurality of intermediate image locations. The intermediate image locations are separated along the longitudinal axis. An achromatic imaging lens is disposed to receive the projected wavelengths of light corresponding to the intermediate image locations from the quasi-collimating lens. A pixelated detector is positioned to receive the light from the achromatic imaging lens. The achromatic imaging lens and the pixelated detector are movable relative to one another in the direction of the longitudinal axis over a range of separation distances. The system is configured such that the projected wavelengths of light form images for different ones of the wavelengths (i.e., the projected wavelengths of light each form a corresponding image). The images are formed on the detector when different distances within the range are achieved.

In some embodiments, each of the images formed on the pixelated detector is separated from each of the other images along the longitudinal axis by at least $p*F/\#$, where p is the pixel pitch of the pixelated detector and $F/\#$ is the F-Number of the achromatic lens.

In some embodiments, each of the images formed on the pixelated detector is separated from each of the other images along the longitudinal axis by at least $\frac{1}{2}*p*F/\#$, where p is the pixel pitch of the pixelated detector and $F/\#$ is the F-Number of the achromatic lens.

In some embodiments, each of the images formed on the pixelated detector is separated from each of the other images along the longitudinal axis by at least $\frac{1}{8}*p*F/\#$, p is the pixel pitch of the detector and $F/\#$ is the F-Number of the achromatic lens.

In some embodiments, the quasi-collimating lens is collimating for at least one of the wavelengths of light.

The quasi-collimating lens may be quasi-collimating for all of the wavelengths of light.

The pixelated detector may comprise an array of pixels, e.g., a two-dimensional array of pixels.

In some embodiments, the system is configured such that the images are formed on the detector when different distances within the range are achieved, for an object at infinity.

In some embodiments, the quasi-collimating lens is a Galilean telescope system.

In some embodiments, the quasi-collimating lens is a Keplerian telescope system.

The wavelengths of light may extend from at least 486 nm-656 nm.

In some embodiments, the quasi-collimating lens has a largest back image distance for the wavelengths of light that is >100 mm and <200 mm and a dispersive performance >0.10.

In some embodiments, the quasi-collimating lens has a largest back image distance for the wavelengths of light that is >200 mm and <500 mm and a dispersive performance >0.20.

In some embodiments, the quasi-collimating lens has a largest back image distance for the wavelengths of light that is >500 mm and a dispersive performance >0.50.

Another aspect of the invention is directed to a Galilean chromatic lens system, comprising at least a positive lens having a first axial chromatic change of focus between a first wavelength and a second wavelength, and a negative lens having a second chromatic axial change of focus between the first wavelength and the second wavelength. The first axial chromatic change of focus is different than the second axial chromatic change of focus. The lens system has a focal length greater than 2000 mm for the first wavelength and less than 500 mm for the second wavelength.

These and other aspects of the present invention will become apparent upon a review of the following detailed description and the claims appended thereto.

The term "operational wavelength of light" is defined herein to mean a wavelength of light for which multispectral image information is obtained.

The term "lens element" is defined herein to mean a single optical component having optical power.

The term "lens system" is defined herein as one or more lens elements operating together to perform a specified optical function. The term "lens" as used herein (as in a quasi-collimating lens) refers to a lens system.

The term "back image distance" is defined herein as the distance from the back surface of a lens system to a specified back image location of the lens system.

The term "focal length" is defined herein as the distance from the back principal plane of a lens system to the back focal point of the lens system.

The term "quasi-collimating lens" will be used herein to refer to a lens having an image distance for at least one operational wavelength of light that is at least 50× the pupil diameter of the entrance pupil of an achromatic lens to which it outputs light.

In the FIGS. provided, light is assumed to travel from left to right, and dimensions measured from a subject lens or a specified surface of the subject lens are labeled with positive numbers to the right of the subject lens and negative numbers to the left of the subject lens.

DETAILED DESCRIPTION

The invention will be further illustrated with reference to the following specific examples. It is understood that these examples are given by way of illustration and are not meant to limit the scope of the claims to follow to any particular embodiment.

Figure 1:
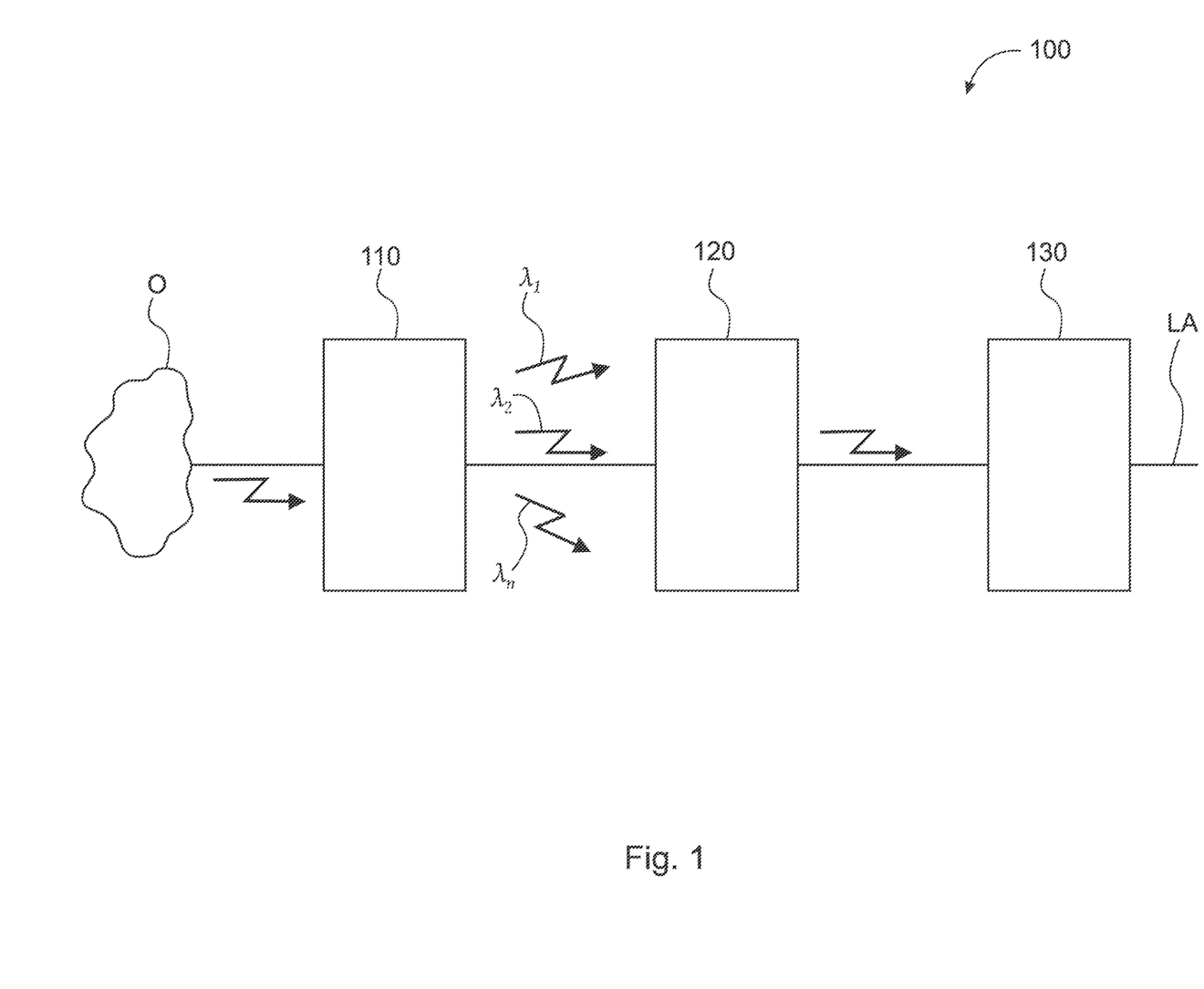
FIG. 1 is a schematic illustration of an example of a camera system providing multispectral image information according to aspects of the present invention.

FIG. 1 is a schematic illustration of an example of a camera system 100 capable of providing multispectral image information according to aspects of the present invention. System 100 has a longitudinal axis LA. Camera system 100 includes a quasi-collimating, highly-dispersive, lens system 110 along with an achromatic imaging lens 120 to project a plurality of images of an object O toward a translatable, pixelated image detector 130 according to aspects of the present invention. In some embodiments, the lens system 110 is provided as a supplemental lens to be attached to a conventional camera comprising achromatic imaging lens 120 and detector 130, such as a camera phone. Mechanical apparatus to attach the supplemental lens to the conventional camera (not shown) may take the form of any known or yet-to-be developed apparatus.

Len system 110 receives light from object O and separates wavelengths of the light ($\lambda_1, \lambda_2 \ldots \lambda_n$). Each wavelength is projected in a direction corresponding to one of a plurality of intermediate image locations (shown in FIG. 3B). The intermediate image locations are separated along longitudinal axis LA. The wavelengths of light travel to the right from lens system 110 in FIG. 1 toward achromatic lens 120 but, in some cases, each is conventionally understood to correspond to a related virtual image location to the left of lens system 110 (as apparent for lens system 310 in FIG. 3B).

Lens system 110 is configured such that, for at least one operational wavelength ($\lambda_1, \lambda_2 \ldots \lambda_n$), the corresponding intermediate image is located such that the lens system can be characterized as a quasi-collimating lens. Such a wavelength is referred to as a selected wavelength. It will be understood that, because lens system is relatively highly-dispersive, for wavelengths other than the selected wavelength, the degree to which lens system 110 is collimating will vary. In some embodiments, lens system 110 is a focal for the selected wavelength. In some embodiments, lens system 110 is collimating at a given object distance, for the selected wavelength. In some embodiments, lens system 110 is quasi-collimating for all operational wavelengths.

Lens system 110 may comprise two or more lenses. Typically, it will be desirable that lens system 110 contribute low amounts of monochromatic aberrations relative to achromatic lens system 120 to preserve the image quality with which the achromatic lens would provide on detector 130 in the absence of lens system 110. However, such a design is not essential. In some embodiments, since through-focus image information is captured and processed by system 100, distortion and field curvature aberrations can be compensated for computationally. In some embodiments, the presence of some non-chromatic aberrations may allow a simpler design for lens system 110.

It is to be appreciated that, for a chromatic lens system using a positive lens and negative lens, the greater the difference between the Abbe number (or other similar dispersion metric if non-visible wavelengths are used) between the positive and negative lenses, the greater the amount of chromatic image spread. However, in some embodiments, instead of using two glasses with a large difference in Abbe numbers, the ratio of the magnitude of the lens powers of the positive and negative lenses can be made to deviate from a value of 1 in order to achieve greater chromatic image spread.

Referring to Examples 1-5 below, it is apparent that, in some embodiments, the chromatic lens operates as a collimating lens for at least one wavelength in the wavelength band that is imaged onto detector 130 (i.e., light of the at least one wavelength is output for chromatic lens with a planar wavefront). However, it will be appreciated that advantages of the present invention may be obtained for lenses that do not result in planar wavefronts although the light may be approximately planar.

Achromatic imaging lens 120 receives the projected wavelengths of light corresponding to the intermediate image locations from lens system 110. Lens 120 may be any suitable, existing or yet-to-be developed achromatic imaging lens (e.g., a well-corrected camera lens). Imaging lens 120 is designed in conjunction with the detector arrangement such that objects at selected locations are projected onto detector 130 with a relatively high quality, for wavelengths across a selected spectrum (e.g., $\lambda_1, \lambda_2 \ldots \lambda_n$).

Pixelated detector 130 is positioned to receive the light from imaging lens 120. Imaging lens 120 and the detector 130 are movable relative to one another in the direction of longitudinal axis LA over a range of separation distances. Any known technique for moving imaging lens 120 and/or detector 130 may be used. In some instances, the imaging lens 120 may comprise two or more lens elements, and the relative movement between imaging lens 120 and detector 130 may be achieved by moving only one element (perhaps an internal element) of imaging lens 120. In some instances, imaging lens 120 may comprise a liquid lens or other type of programmable lens with a tunable surface shape as a focusing mechanism, and the relative movement between imaging lens 120 and detector 130 may be achieved by tuning the surface shape of the liquid lens or programmable lens. Detector 130 may be located on the longitudinal axis or off the longitudinal axis.

The system is configured such that the projected wavelengths of light form images for different ones of the wavelengths (or wavelength bands) on detector 130. The images formed at different locations over the range of separation distances. At a given separation distance, light from one of the images is focused on detector 130 and the light from the remaining image is incident on the detector, but out of focus. As set forth below, there is a known mathematical relationship between the captured data including image locations, and the multispectral image information of the images.

Detector 130 may be any conventional detector. The pixelated detector is typically an area detector array, but may be a linear array detector. For example, the detector may be a CCD detector or a CMOS detector.

Figure 2:
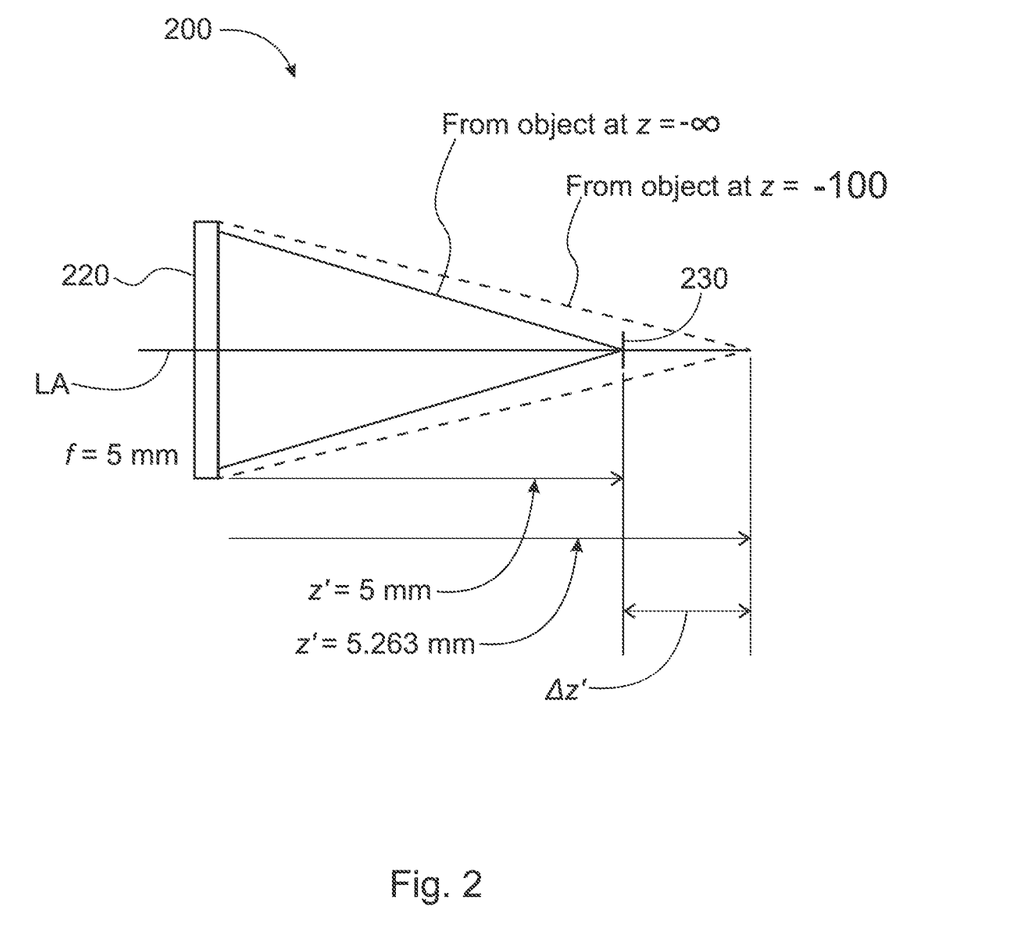
FIG. 2 is a schematic illustration of an example of a camera comprising a conventional achromatic imaging lens and detector.

FIG. 2 is a schematic illustration of an example of a camera 200 comprising a conventional achromatic imaging lens 220 and a detector 230. In the present example, detector 230 is translatable along longitudinal axis LA and imaging lens 220 has a focal length of 5 mm; however an imaging lens having any suitable focal length may be used and any suitable apparatus to achieve relative movement between imaging lens 120 and detector 130 may be used.

As illustrated, for an achromatic lens having a focal length of 5 mm (and operating without the presence of a chromatic lens), assuming that the range of translation of the detector begins at a location corresponding to an object at infinity for a selected wavelength and that a total translation of 263 microns is possible, the detector will be able to translate such that objects ranging from a distance of minus infinity to minus 100 millimeters (mm) can be brought into focus on the detector. Although, the range in the example begins at a location corresponding to an object at infinity, a range of translation can begin at any suitable location. It is noted that, for ease of description, the present example is discussed assuming that the chromatic lens and achromatic lens are ideal thin lenses, that diffraction effects are ignored, and that the object and image locations achieve ideal imaging and focus. It is noted that, in a real system, the depth of field (i.e., object focus region for a fixed separation distance between a lens and a detector array) and depth of focus (i.e., image focus region for a fixed object distance) is related to the system's pixel size, the F/#, and other real-world limitations of optics, like the diffraction limit, and that one of ordinary skill in the art of optical system design would be capable of designing a real lens system using the teaching of the present disclosure.

Figure 3A:
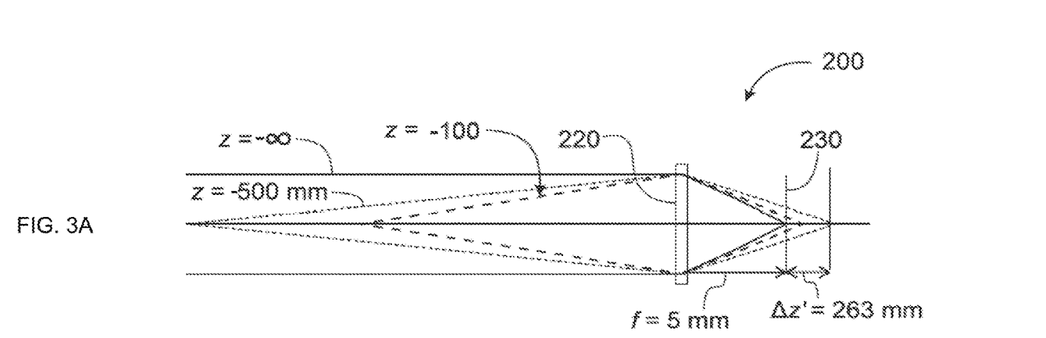
FIG. 3A shows a camera comprising an achromatic lens system, along with object locations and conjugate image locations that are within a range of translation of a detector.
Figure 3B:
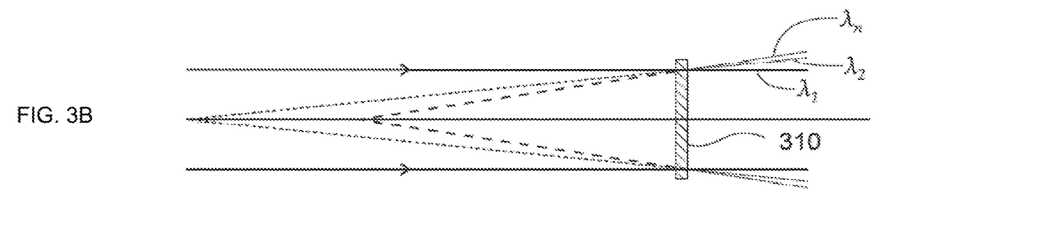
FIG. 3B illustrates the performance of a quasi-collimating, chromatic, lens system with an object located at infinity and the object emitting light over a spectrum of wavelengths $\lambda_1 \ldots \lambda_n$.
Figure 3C:
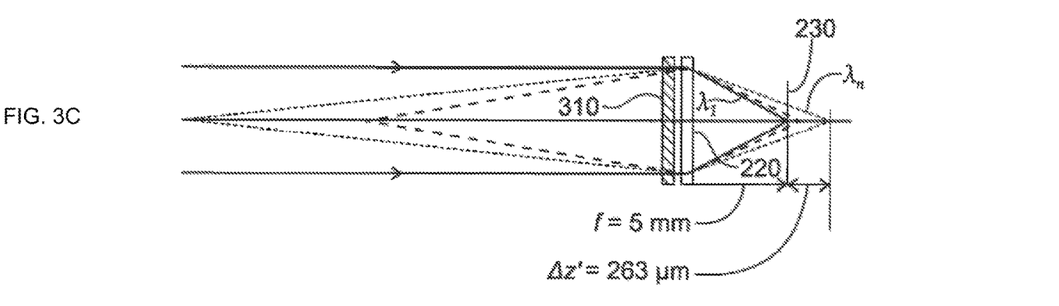
FIG. 3C shows images corresponding to wavelengths $\lambda_1 \ldots \lambda_n$ focused on the detector at locations within the range of translation, the light passing through the quasi-collimating lens system and the achromatic lens system.

FIGS. 3A-3C further illustrate the performance of camera 200, including performance when used with a quasi-collimating, lens system 310 according to aspects of the present invention. FIG. 3A shows camera 200 along with object locations and conjugate image locations that are within the range of translation. That is, images of the object can be focused on detector 230 when the object is located at distances between minus infinity and −100 mm, relative to lens system 220.

FIG. 3B illustrates the performance of a quasi-collimating, chromatic, lens system 310 with an object located at infinity and the object emits light over a spectrum of wavelengths. Lens system 310 is relatively, highly dispersive. As illustrated, for a selected wavelength of light ($\lambda_1$), the light exits the lens parallel to the optical axis (i.e., lens system 310 is collimated for light having a wavelength $\lambda_1$). However, since lens 310 is to be a dispersive lens system, it can be expected that the lens will deviate from the collimating performance (i.e., the lens will have a negative or positive power) for light having a wavelength other than selected wavelength $\lambda_1$. Whether the lens has positive power or negative power depends whether the wavelengths are longer or shorter than the selected wavelength and the dispersion function of lens 310.

In FIG. 3B, wavelengths $\lambda_2, \ldots \lambda_n$ result in lens 310 having a more negative power than the power of lens 310 at $\lambda_1$. Thus, for an object at infinity, light having wavelengths $\lambda_2$ and $\lambda_n$ correspond to virtual images at −500 mm and −100 mm, respectively.

As shown in FIG. 3C, images corresponding to the wavelengths ($\lambda_1 \ldots \lambda_n$) are focused on detector 230 at locations within the range of translation. Wavelength $\lambda_1$ which is collimated by lens system 310 is focused by lens system 220 at the near edge of the range of translation of detector 230; and wavelength $\lambda_n$ which corresponds to the most negative power of lens system 310 is focused by lens system 220 at the far edge of the range of translation of detector 230.

In order for system 100 to achieve a higher spectral resolution and fidelity across wavelengths $\lambda_1 \ldots \lambda_n$, it is desirable that the combination of the chromatic lens and the camera lens map the images of wavelengths $\lambda_1 \ldots \lambda_n$ across as much of the range of translation as possible.

Figure 4:
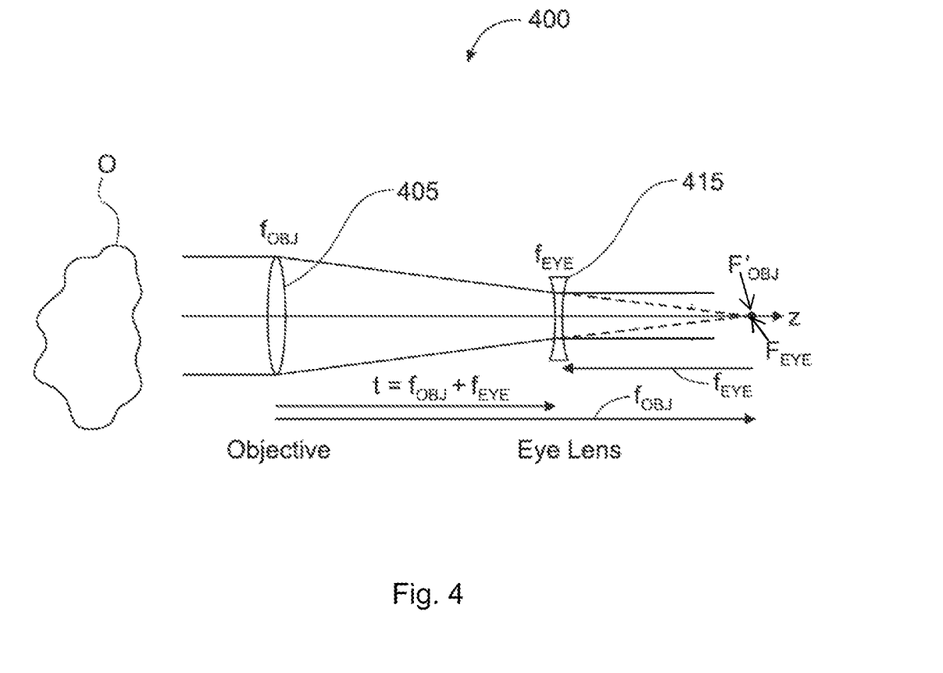
FIG. 4 is a schematic illustration of one example of a quasi-collimating lens system according aspects of the present invention

FIG. 4 is a schematic illustration of one example of a quasi-collimating, lens system 400 according aspects of the present invention. In lens system 400, positive element 405 is located closest to object O, and negative element 415 is disposed closest to the camera lens (e.g., imaging lens 220 of FIG. 2). Positive element 405 and negative element 415 are separated by a distance equal to the sum of the focal lengths of the lenses for at least one wavelength of light. It is to be appreciated that lens system 400 is configured as a Galilean telescope. In some embodiments, Galilean telescope designs offer advantages of relatively short axial length as compared to other collimating lens systems.

The following is a discussion of lens system 400 as it relates to operating as a dispersive unit. In the discussion below, lenses 405 and 415 are discussed using well-known thin lens assumptions. As indicated above, it is to be understood that, although thin lens assumptions are made to facilitate discussion, a physical embodiment of a lens design according to aspects of the present invention can be readily implemented by one of ordinary skill in the art of optical design using teachings of this disclosure and known design techniques.

Positive lens 405 is an ideal lens having a focal length $f_{OBJ}$ of 12 mm at the F wavelength (486 nm, blue) and an Abbe number $v_{OBJ}$ of 40 (i.e., a relatively high dispersion).

The axial chromatic change of focus provided by lens 405 can be approximated by:

$$\delta f = \frac{f_{OBJ}}{v_{OBJ}} = 300 \ \mu m,$$

as described, for example, by John E. Greivenkamp in The Field Guide to Geometrical Optics published by SPIE Press in Bellingham, Wash., USA. Accordingly, light having an F wavelength will focus at 12 mm and light having a C wavelength (656 nm, red) will focus at 12.3 mm when collimated light having wavelengths F and C are input into positive lens 405.

Negative lens 415 is an ideal lens having a focal length $f_{eye}$ of −5 mm at the F wavelength (486 nm) and an Abbe number $v_{eye}$ of 60 (a relatively low dispersion). The axial chromatic change of focus provided by lens 415 can be approximated by:

$$\delta f = \frac{f_{eye}}{v_{eye}} \approx -83 \ \mu m.$$

Accordingly, light having an F wavelength will focus at −5 mm, and light having a C wavelength will focus at −5.083 mm when collimated light having wavelengths F and C are input into negative lens 415.

In the present example, lenses 405 and 415 will be placed 7 mm apart. Accordingly, for the F wavelength of light, lens system 400 will perform like a Galilean telescope. For collimated F wavelength light that is input into lens 405 (i.e., when object O is at infinity), the light will emerge from lens 415 collimated (i.e., the final image will be located at infinity). The output is collimated for the F wavelength of light because lenses 405 and 415 are separated by the sum of their focal lengths, namely 7 mm (i.e., 12 mm+(−5 mm)). In such a configuration, the back focal point of the first lens overlaps the front focal point of the second lens at the F wavelength.

At the C-wavelength, 656 nm, the focal length of the first lens is 12.3 mm, the focal length of the second lens is −5.083 mm. However, lenses 405 and 415 are separated by 7 mm. This means the back focal point of the first lens and the front focal point of the second lens are separated by 217 μm. Accordingly, for an object located at minus infinity, a virtual image is formed by lens system 400, the virtual image is located at −124 mm, to the left of lens 415.

If the lens system 400 is placed adjacent camera 200 (described above with reference to FIG. 2), where lens 415 of FIG. 4 is located 2 mm to the left of lens system 220 of FIG. 2, it can be observed that, since the chromatic quasi-collimating lens forms intermediate images in the F-C wavelength range (486 nm-656 nm) within −∞ to −124 with respect to lens 415 of FIG. 4 (corresponding to −∞ to −126 mm with respect to lens system 220 of FIG. 2), all of the intermediate images corresponding to F-C wavelengths will be imaged to final images located within the translation range of detector 230 (shown in FIG. 2) and the detector captures the final images at the final image locations. In particular, a final series of wavelength-dependent images of an object O that is at −∞, will be formed between 5 mm and 5.206 mm from imaging lens 220, within the translation range of detector 230 (i.e., 5 mm to 5.263 mm).

It is to be understood that although, in system 400, the Galilean design results in collimation of F-wavelength light being output from the system, Galilean designs according to aspects of the present invention, while quasi-collimating, need not be collimating for any operational wavelength of light or object position.

The greater the axial separation of the images along the z-axis, the more accurately and precisely the multispectral image information can be computed. If the axial separation along the z-axis is not sufficient to resolve two wavelengths (e.g., $\lambda_1$, $\lambda_2$), the data collected by the detector will be insufficient to compute the multispectral image information for wavelengths $\lambda_1$, $\lambda_2$.

When the axial separation between the image locations for $\lambda_1$, $\lambda_2$ is sufficient, the light gathered at the image locations can be used to calculate the relative amounts of $\lambda_1$, $\lambda_2$. One technique for calculating spectral content is given in PCT Patent Application WO 2011/138606 by Laycock, published Nov. 10, 2011, the substance of said patent application is hereby incorporated by reference in its entirety.

The ratio of the amount of light from any two wavelengths that is gathered by a pixel located along the z-axis, varies with the location of the pixel along the z-axis (i.e., varies over the translation range of the detector) provided the axial separation between the image locations of the two wavelengths is sufficient. Equation 1 gives the minimum axial separation between image locations (e.g., image locations for $\lambda_1$ and $\lambda_2$) which will result in the wavelengths ($\lambda_1$, $\lambda_2$) being resolvable by a given camera.

minimum axial separation=$p*(F/\#)$      Equation 1 where p is the pixel pitch of the detector and F/# is the F-Number of the achromatic lens.

If the image separation between the image locations of the two wavelengths is less than the value given by Equation 1, the ratio between the signal strength of the two wavelengths on the pixel will not change upon translation of the detector along the z-direction, and the wavelengths will not be resolvable.

Although Equation 1 is the limit for light gathered on-axis and at focus, the minimum separation value can be lower away from focus (e.g., $\frac{1}{2}p*(F/\#)$), and even lower for off-axis pixels (e.g., $\frac{1}{8}p*(F/\#)$). In this disclosure, for some embodiments, for simplicity, and to provide a safety factor for diffractive effects, noise, and other practical reasons, the minimum image spacing will be defined as $p*(F/\#)$. However, other image spacing values may be used, with suitable design consideration. Accordingly, in some embodiments, Equation 1 provides a design goal for final axial image spread and spectral resolution for a system. However, it is to be understood, that Equation 1 is not a limitation for systems within the scope of aspects of the present invention, in particular, for embodiments using unfocused light and/or off-axis pixels.

Furthermore, in some embodiments, the measurements occur for bins of wavelengths (i.e., wavelength bands). In such instances, if a chromatic lens induces a final axial image spread (after the achromatic lens) of 30 times $p*(F/\#)$ from 400 nm to 600 nm, the chromatic lens will provide for the measurement of 31 wavelength bins, starting at 400 nm and going to 600 nm. The data for the bins can be captured over 31 measurements at $p*(F/\#)$ axial distance increments along the longitudinal axis. It is to be appreciated that, depending on the axial dispersion curve of the lens system, the various wavelength bins (having respective axial locations for data capture spaced by a width of p*(F/#)) may or may not be of equal bin width in wavelength.

It will be appreciated that, for a given camera, there is a defined amount of translation between the camera lens and the detector. Therefore, for a given camera, independent of the axial image spread, the number of wavelength bins available is limited by the amount of translation of the camera, divided by the minimum axial separation needed to resolve selected wavelengths of light. It will also be appreciated that conventional achromatic camera lenses, while readily commercially-available (and commonly integrated into electronics such as camera phones which are already widely purchased), do not provide axial image spread. Furthermore, because achromatic camera lenses have relatively low F/#s, substantial fields of view and superior image quality, they are generally difficult and/or expensive to design and manufacture due to high mechanical tolerances, high element-count and common use of non-spherical surfaces. It will be further appreciated that to design and manufacture a chromatic, camera lens having a relatively low F/#, a substantial field of view and superior image quality in addition to sufficient axial image spread would be difficult and/or expensive similarly expensive due to high mechanical tolerances, high element-count and common use of non-spherical surfaces. It will also be appreciated that a quasi-collimating, chromatic lens as set forth herein will preserve the low F/# of an achromatic camera lens if the exit pupil of the quasi-collimating lens is disposed at the same plane as the entrance pupil of the achromatic camera lens and has a diameter equal to or greater than the diameter of the entrance pupil of the achromatic camera lens. However, an advantage of a supplemental, quasi-collimating chromatic lens that is designed as set for the herein is that, because it has a relatively low power compared to the camera lens and the exit pupil can be of equal size as the entrance pupil of the camera lens, the quasi-collimating lens can have a higher F/# than the camera lens. Accordingly, the supplemental quasi-collimating lens is significantly easier and/or less expensive to design and manufacture than a chromatic camera lens providing equivalent spectral resolution due to low mechanical tolerances, low element-count and less-common use of non-spherical surfaces.

An alternative way to quantify the dispersive performance of a lens is shown in Equation 2. In Equation 2, dispersive performance is measured by the separation of the images corresponding to the edges of a selected wavelength band.

$$\text{Dispersive Performance} = \frac{ID_{far} - ID_{near}}{ID_{far}} \quad \text{Equation 2}$$

where $ID_{near}$ is the near image distance of the relevant spectrum as measured from the back surface of the lens; and $ID_{far}$ is the far image distance of the relevant spectrum as measured from the back surface of the lens To understand the dispersive performance of examples of chromatic lenses for use with the present invention, it is helpful to consider the relative performance of typical optical systems. A typical, uncorrected, single element lens system has a dispersive performance for the F and C wavelengths of 0.01-0.03; and a typical multi-lens system corrected for chromatic aberration has a dispersive performance of 0.0001. Dispersive performance of chromatic lenses for use in embodiments of the present invention would, typically, have dispersive performance values that are quantified based on the largest back image distance of the dispersive lens for wavelengths within the selected wavelength band, given as follows.

For a largest back image distance ≥100 mm but <200 mm for an operational wavelength of light the dispersive performance ≥0.10

For a largest back image distance ≥200 mm but <500 mm for an operational wavelength of light the dispersive performance ≥0.20

For a largest back image distance ≥500 mm for an operational wavelength of light the dispersive performance of ≥0.50.

It is noted that the above dispersive performance values are suitable for some embodiments of camera phone systems, more specifically for achromatic camera lenses with focal lengths between 2 mm and 20 mm. These dispersive performance values may also be applicable for some embodiments of achromatic camera lenses of longer or short focal lengths; however other performance values within the scope of the aspects of the present invention may be used.

Again referring to FIG. 4, although the embodiment described in FIG. 4 is a Galilean telescope which is recognized to have some advantages including its relatively compact size, other constructions of a quasi-collimating, lens system are within the scope of the present invention. For example, the lens system may be a Keplerian telescope configuration, having two positive lens systems where the lenses are separated by the sums of their focal lengths.

Additionally, although the above embodiment of FIG. 4 was described using a conventional Galilean telescope with the positive lens closer to the object than the negative lens to achieve telephoto performance, other configuration of a quasi-collimating lens system may be used. For example, in some embodiments, the quasi-collimating lens system may be a reverse Galilean with the negative lens closer to the object than the positive lens to achieve wide-angle performance when imaging the object. Also, although the embodiment is shown with a positive lens being a single element and the negative lens being a single element, in some embodiments, either the positive lens or the negative lens may comprise two or more elements.

In some embodiments, additional image spread is attained by using two chromatic lens systems back-to-back (i.e., in series) as the quasi-collimating lens, with the two chromatic lens systems both being located between the object and the camera lens. It is typically desirable, for such a design, that the chromatic lens closer to the camera lens system is a quasi-collimating lens, and that the chromatic lens that is closer to the object be designed such that, if the chromatic lens system closer to the camera lens were omitted, the chromatic lens that is closer to the object would be quasi-collimating.

Further, as indicated above, in a Galilean telescope system, the separation between the positive lens and the negative lens of a collimating system is equal to the sum of the focal lengths. Accordingly in a Galilean system, if the focal lengths of the positive lens and the negative lens are of equal magnitude (+5 mm and −5 mm), the lenses form a doublet having surfaces in contact (i.e., they form a cemented doublet). In some embodiments of a cemented doublet, the contacting surfaces are configured and positioned to be concentric with a pupil of the lens system to reduce aberrations. In some embodiments, multiple doublets, each comprising a positive element and a negative element with surfaces in contact, provide increased wavelength spread while using relatively little space. In embodiments using multiple cemented doublets, the contacting surfaces of both doublets may be made to be concentric with a pupil of the lens system to reduce aberrations.

Multispectral imaging systems as described herein can capture image information corresponding to the various image locations using the detector, and store the image information in memory (not shown). It will be appreciated that, with the information gathered from the images, the information can be processed using any known processing technique for obtaining more, readily useable multispectral image information from the blurred multispectral information obtained by the detector. One example of such a technique is given in PCT Patent Application WO 2011/138606, the substance of said patent application was incorporated by reference above.

Although embodiments were described herein as having detectors comprising multiple pixels in other embodiments, the detector may have only a single pixel. Typically, a single-pixel detector is disposed on the longitudinal axis; however the detector may be located off axis.

Further examples of optical systems (each including a quasi-collimating lens) suitable for use with aspects of the present invention are given below in Examples 1-5. The chromatic lens is shown as a real lens system (i.e., the lens elements comprising the chromatic lens have thickness and radii), and the achromatic lens is shown as a vertical line (i.e., thin lens/paraxial performance) since the achromatic lens has near ideal performance.

Example 1

Wide-Angle Chromatic Lens (Reverse Galilean Design). Object at Infinity

Prescription:

|   | Surf:Type | Radius | Thickness | Material | Semi-Diameter | Focal Length |
|---|-----------|--------|-----------|----------|---------------|--------------|
| 0 | OBJECT    | Standard | Infinity | Infinity |     | Infinity |     |
| 1 | (aper)    | Standard | −18.175  | 4.000    | FK5 | 4.000   |     |
| 2 | (aper)    | Standard | 15.031   | 10.000   |     | 4.000   |     |
| 3 | (aper)    | Standard | −72.692  | 1.500    | SF66 | 3.000  |     |
| 4 | (aper)    | Standard | −20.579  | 0.300    |     | 3.000   |     |
| 5 | STOP      | Paraxial |          | 5.060    |     | 1.920   | 5.000 |
| 6 | IMAGE     | Standard | Infinity | —        |     | 0.504   |     |

Notes:
An achromatic camera lens (shown as paraxial surface 5) has the following characteristics: 5 mm focal length, F/1.4
A chromatic lens system (shown as surfaces 1-4) has the following characteristic: 10 degree half field of view input
A Detector (shown as surface 6) has the following characteristic 1.008 mm detector diameter The Camera system (including the chromatic lens) has the following wavelength-dependent performance

| Wavelength | 400 nm | 550 nm | 700 nm |
|---|---|---|---|
| Chromatic Lens Focal Length* | 6049 mm | −252 mm | −189 mm |
| Intermediate Image Distance of the Chromatic Lens (i.e., after Surface 4*) | 10710 mm | −443 mm | −331 mm |
| Final image distance after achromatic lens** | 5 mm | 5.06 mm | 5.08 mm |

*On-axis, paraxial measurement
**Best focus
80 μm final chromatic image shift between wavelengths 400-700 nm
The camera gives rise to 57 wavelength bins assuming a detector having a 1 μm pixel pitch.

Example 2

Telephoto Chromatic Lens (Forward Galilean Design). Object at Infinity

Prescription:

|   | Surf:Type | Radius | Thickness | Material | Semi-Diameter | Conic | Focal Length |
|---|-----------|--------|-----------|----------|---------------|-------|--------------|
| 0 | OBJECT | Standard | Infinity | Infinity |       | Infinity | 0.000 |       |
| 1 | (aper)  | Standard | 19.009   | 3.000    | N-SF5 | 8.500    | −0.122 |      |
| 2 | (aper)  | Standard | 90.783   | 20.000   |       | 8.500    | 0.000 |       |
| 3 | (aper)  | Standard | −11.304  | 1.000    | N-BK7 | 2.000    | 0.000 |       |
| 4 | (aper)  | Standard | 14.240   | 1.000    |       | 2.000    | 0.000 |       |
| 5 | STOP    | Paraxial |          | 4.150    |       | 0.943    |       | 4.150 |
| 6 | IMAGE   | Standard | Infinity | —        |       | 0.693    | 0.000 |       |

Notes:
An achromatic camera lens (shown as paraxial surface 5) has the following characteristics: 4.15 mm focal length, F/2.3
Chromatic lens system (shown as surfaces 1-4 in the above chart) 3 degree half field of view input
A Detector (shown as surface 6) has the following characteristic 1.886 mm detector diameter The Camera system (including the chromatic lens) has the following wavelength-dependent performance

| Wavelength | 486 nm | 588 nm | 656 nm |
|---|---|---|---|
| Chromatic Lens Focal Length* | 27816 mm | −703 mm | −502 mm |
| Intermediate Image Distance After Surface 4* | infinity | −255 mm | −185 mm |
| Final image distance after achromatic lens** | 4.150 mm | 4.224 mm | 4.252 mm |

*On-axis, paraxial measurement
**Best focus
102 μm final chromatic image shift between wavelengths 486-656 nm
The camera gives rise to 44 wavelength bins assuming a detector having a 1 μm pixel pitch.

Example 3

Dual, Concentric Buried Surface Chromatic Lens (Two Cemented Doublets). Object at Infinity Prescription:

| | Surf:Type | | Radius | Thickness | Material | Semi-Diameter | Focal Length |
|---|---|---|---|---|---|---|---|
| 0 | OBJECT | Standard | Infinity | Infinity | | Infinity | |
| 1 | (aper) | Standard | 60.922 | 0.400 | N-SK16 | 2.000 | |
| 2 | (aper) | Standard | 2.880 | 1.000 | N-F2 | 2.000 | |
| 3 | (aper) | Standard | 13.392 | 0.553 | | 2.000 | |
| 4 | (aper) | Standard | 14.707 | 0.200 | N-SK16 | 1.500 | |
| 5 | (aper) | Standard | 2.021 | 1.000 | N-F2 | 1.500 | |
| 6 | (aper) | Standard | 58.494 | 0.500 | | 1.500 | |
| 7 | STOP | Paraxial | | 4.150 | | 0.953 | 4.150 |
| 8 | IMAGE | Standard | Infinity | — | | 1.529 | |

Notes:
An achromatic camera lens (shown as paraxial surface 7) has the following characteristics: 4.15 mm focal length, F/2.3
Chromatic lens system (shown as surfaces 1-6 in the above chart) 20 degree half field of view
A Detector (shown as surface 8) has the following characteristic 3.058 mm detector diameter The Camera system (including the chromatic lens) has the following wavelength-dependent performance

| Wavelength | 486 nm | 588 nm | 656 nm |
|---|---|---|---|
| Chromatic Lens Focal Length* | −2797 mm | −247 mm | −184 mm |
| Intermediate Image Distance After Surface 6* | −2807 mm | −249 mm | −186 mm |
| Final image distance after achromatic lens** | 4.150 mm | 4.222 mm | 4.250 mm |

*On-axis, paraxial measurement
**Best focus
100 μm final chromatic image shift between wavelengths 486-656 nm
The camera gives rise to 43 wavelength bins assuming a detector having 1 μm pixel pitch.
System doubled for twice the chromatic effect over a single doublet.

Example 4

Macro Chromatic Lens. Object is at 20 mm (Very Close). Finite Image Location Prescription:

| | Surf:Type | | Radius | Thickness | Material | Semi-Diameter | Focal Length |
|---|---|---|---|---|---|---|---|
| 0 | OBJECT | Standard | Infinity | 20.000 | | 5.000 | |
| 1 | (aper) | Standard | −3.666 | 2.000 | PSK52 | 1.500 | |

-continued

| | Surf:Type | Radius | Thickness | Material | Semi-Diameter | Focal Length |
|---|---|---|---|---|---|---|
| 2 (aper) | Standard | 8.890 | 1.000 | | 1.500 | |
| 3 (aper) | Standard | 95.994 | 2.000 | P-SF67 | 1.500 | |
| 4 (aper) | Standard | −6.077 | 1.000 | | 1.500 | |
| 5 STOP | Paraxial | | 4.150 | | 0.943 | 4.150 |
| 6 IMAGE | Standard | Infinity | — | | 0.539 | |

Notes:
An achromatic camera lens (shown as paraxial surface 5) has the following characteristics: 4.15 mm focal length, F/2.3
Chromatic lens system (shown as surfaces 1-4 in the above chart) 10 mm object diameter
A Detector (shown as surface 6) has the following characteristic 1.078 mm detector diameter The Camera system (including the chromatic lens) has the following wavelength-dependent performance

| Wavelength | 486 nm | 588 nm | 656 nm |
|---|---|---|---|
| Chromatic Lens Focal Length* | −61 mm | −82 mm | −94 mm |
| Chromatic Lens Front Focal Distance* | −19 mm | −26 mm | −30 mm |
| Intermediate Image Distance After Surface 4* | 5313 mm | −266 mm | −191 mm |
| Final image distance after achromatic lens** | 4.150 mm | 4.222 mm | 4.250 mm |

*On-axis, paraxial measurement
**Best focus
100 μm final chromatic image shift between wavelengths 486-656 nm
The camera gives rise to 43 wavelength bins assuming a detector having 1 μm pixel pitch
Large chromatic shift of front focal point of chromatic lens enables intermediate image spread across object-focusable range Example 5

Wide Angle Lens. Object at 200 mm (Mid Range)

Prescription:

| | Surf:Type | Radius | Thickness | Material | Semi-Diameter | Focal Length |
|---|---|---|---|---|---|---|
| 0 OBJECT | Standard | Infinity | 200.000 | | 35.916 | |
| 1 (aper) | Standard | −11.033 | 2.000 | N-BK7 | 1.200 | |
| 2 (aper) | Standard | 3.221 | 5.005 | | 1.200 | |
| 3 (aper) | Standard | −10.559 | 2.000 | N-SF6 | 1.200 | |
| 4 (aper) | Standard | −5.579 | 0.500 | | 1.200 | |
| 5 STOP | Paraxial | | 4.200 | | 0.943 | 4.150 |
| 6 IMAGE | Standard | Infinity | — | | 0.282 | |

Notes:
An achromatic camera lens (shown as paraxial surface 5) has the following characteristics: 4.15 mm focal length, F/2.3
Chromatic lens system (shown as surfaces 1-4 in the above chart) 10 degree half field of view
A Detector (shown as surface 6) has the following characteristic 0.564 mm detector diameter The Camera system (including the chromatic lens) has the following wavelength-dependent performance

| Wavelength | 486 nm | 588 nm | 656 nm |
|---|---|---|---|
| Chromatic Lens Focal Length* | −502 mm | −257 mm | −216 mm |
| Chromatic Lens Front Focal Distance* | 79 mm | 43 mm | 37 mm |
| Intermediate Image Distance After Surface 4* | −367 mm | −216 mm | −186 mm |
| Final image distance after achromatic lens** | 4.200 mm | 4.236 mm | 4.250 mm |

*On-axis, paraxial measurement
**Best focus
50 μm final chromatic image shift between wavelengths 486-656 nm
The camera gives rise to 21 wavelength bins assuming a detector having 1 μm pixel pitch Although many of the examples above use quasi-collimating chromatic lenses that comprise traditional two-element telescope lens systems (e.g., Galilean or Keplerian with lens spacing approximately equal to the sum of the focal lengths of the two lenses), it will be appreciated that one of ordinary skill in the art of optical design could design a quasi-collimating chromatic lens that is not a traditional two-element telescope lens system by using teachings of this disclosure and known design techniques. Such systems may comprise two or more lens elements.

Although various embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A camera system for providing multispectral imaging of an object, the camera system having a longitudinal axis, the camera system comprising:
   a quasi-collimating lens capable of receiving light from the object and separating wavelengths of the light, each wavelength projected in a direction corresponding to one of a plurality of intermediate image locations, the intermediate image locations separated along the longitudinal axis;

an achromatic imaging lens disposed to receive the projected wavelengths of light corresponding to the intermediate image locations from the quasi-collimating lens; and a pixelated detector positioned to receive the light from the achromatic imaging lens, the achromatic imaging lens and the pixelated detector movable relative to one another in the direction of the longitudinal axis over a range of separation distances, and the system configured such that the projected wavelengths of light each form a corresponding image, the images formed on the detector when different distances within the range are achieved.

2. The system of claim 1, wherein each of the images formed on the pixelated detector is separated from each of the other images along the longitudinal axis by at least p*F/#, where p is the pixel pitch of the pixelated detector and F/# is the F-Number of the achromatic lens.

3. The system of claim 1, wherein each of the images formed on the pixelated detector is separated from each of the other images along the longitudinal axis by at least ½*p*F/#, where p is the pixel pitch of the pixelated detector and F/# is the F-Number of the achromatic lens.

4. The system of claim 1, wherein each of the images formed on the pixelated detector is separated from each of the other images along the longitudinal axis by at least ⅛*p*F/#, is the pixel pitch of the detector and F/# is the F-Number of the achromatic lens.

5. The system of claim 1, wherein the quasi-collimating lens is collimating for at least one of the wavelengths of light.

6. The system of claim 1, wherein the quasi-collimating lens is quasi-collimating for all of the wavelengths of light.

7. The system of claim 1, wherein the pixelated detector comprises an array of pixels.

8. The system of claim 1, wherein the system is configured such that the images are formed on the detector when different distances within the range are achieved, for an object at infinity.

9. The system of claim 1, wherein the quasi-collimating lens is a Galilean telescope system.

10. The system of claim 1, wherein the quasi-collimating lens is a Keplerian telescope system.

11. The system of claim 1, wherein the wavelengths of light extend from at least 486 nm-656 nm.

12. The system of claim 1, wherein the quasi-collimating lens has a largest back image distance for the wavelengths of light that is ≥100 mm and <200 mm and a dispersive performance ≥0.10.

13. The system of claim 1, wherein the quasi-collimating lens has a largest back image distance for the wavelengths of light that is ≥200 mm and <500 mm and a dispersive performance ≥0.20.

14. The system of claim 1, wherein the quasi-collimating lens has a largest back image distance for the wavelengths of light that is ≥500 mm and a dispersive performance ≥0.50.

15. The system of claim 2, wherein the quasi-collimating lens is collimating for at least one of the wavelengths of light.

16. The system of claim 15, wherein the pixelated detector comprises an array of pixels.

17. The system of claim 16, wherein the system is configured such that the images are formed on the detector when different distances within the range are achieved, for an object at infinity.

18. The system of claim 17, wherein the wavelengths of light extend from at least 486 nm 656 nm.

19. The system of claim 17, wherein the quasi-collimating lens has a largest back image distance for the wavelengths of light that is ≥100 mm and <200 mm and a dispersive performance ≥0.10.

* * * * *